Jan. 27, 1959

C. I. MIZE 2,870,674

MICROSCOPE

Filed Nov. 1, 1956

INVENTOR.
Cecil I. Mize
BY Victor J. Evans & Co.

ATTORNEYS

United States Patent Office 2,870,674
Patented Jan. 27, 1959

2,870,674
MICROSCOPE
Cecil I. Mize, Tacoma, Wash.

Application November 1, 1956, Serial No. 619,747

1 Claim. (Cl. 88—39)

This invention relates to microscopes of the type adapted for laboratory and also for field use and particularly of the type adapted to be attached to a lens mounting of a camera wherein magnified objects may be photographed, and in particular a tubular casing having a lens cell in an enlarged instrument body at one end of the casing with an object mounting transparent body mounted in an opaque sleeve frictionally held in and slidably mounted in a tubular casing whereby an object on the end of the transparent body is aligned with a lens or a lens system in the lens cell of the instrument body.

The purpose of this invention is to provide a microscope wherein an object may be viewed with the instrument held in different positions by hand and also in which the instrument may be temporarily mounted over the lens of a camera for photographing an object on an enlarged scale.

Microscopes have been provided in different forms, however, with the conventional type where an object is placed upon a glass plate it is difficult to align the object with the center of the lens and it is also difficult to hold the microscope to obtain the best lighting effect on the object. With this thought in mind this invention contemplates an improved microscope in which the parts are incorporated in a tubular casing and in which the casing is adapted to be held at different angles to facilitate viewing an object on the end of a transparent body therein.

The object of this invention is, therefore, to provide means for constructing a microscope so that the microscope is adapted to be held in different positions and wherein the microscope is adapted to be positioned over the lens mounting of a camera.

Another object of the invention is to provide a microscope in which an object is positioned on the end of an elongated transparent body and wherein the said transparent body is longitudinally slidable in a casing in which a lens or a lens system is positioned.

A further object of the invention is to provide a microscope in the form of a telescope wherein an object is positioned to be viewed by magnifying lenses and in which the device is of a simple and economical construction.

With these and other objects and advantages in view the invention embodies an elongated tubular casing having an enlarged end, a lens cell having a lens securing ring threaded therein positioned in the enlarged section of the casing, a cap threaded on the enlarged section of the casing and positioned to retain the lens cell in position therein, an elongated tubular holder having a flange on the outer end slidably mounted in the casing, an elongated cylindrical transparent body mounted in the tubular holder, and a friction collar for mounting the microscope on a lens mounting of a camera.

Other features and advantages of the invention will appear from the following description taken in connection with the drawings wherein.

Figure 1:
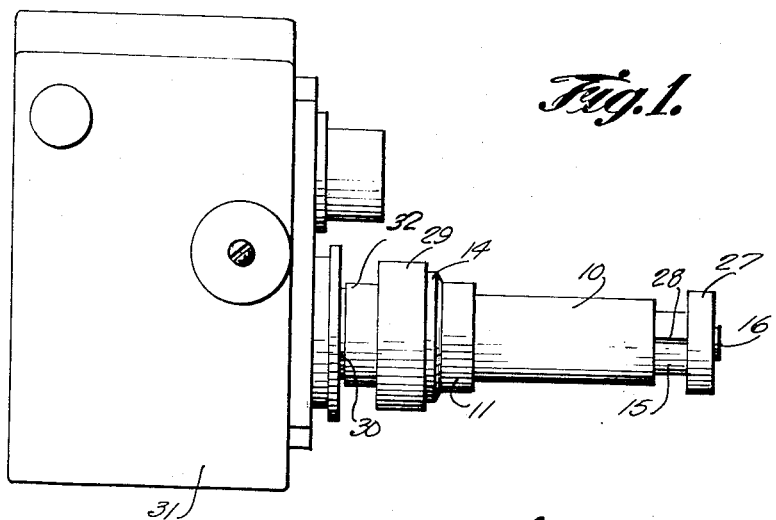
Figure 1 is a side elevational view of a camera showing the improved microscope positioned over the lens mounting thereof.

Referring now to the drawings wherein like reference characters denote corresponding parts the improved microscope of this invention includes an elongated casing 10 having an enlarged section 11 at one end, a lens cell 12 positioned in an annular recess 13 in the enlarged section 11, a cap 14 for retaining the cell 12 in the recess 13, an elongated tubular holder 15 slidably mounted in the casing 10, a transparent cylindrical body 16 positioned in the holder 15 and a cap 17, formed of transparent material, and adapted to retain an object in position on the end of the transparent body 16.

Figure 2:
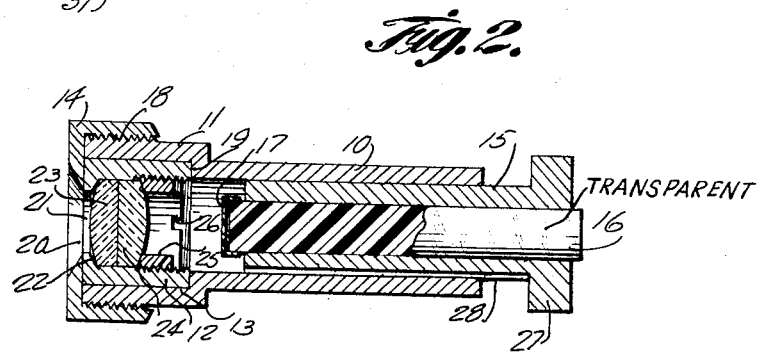
Figure 2 is a longitudinal section through the microscope showing the parts in the operative positions.

The casing 10, which may be formed of metal, plastic, or other suitable material, is in the form of a tube and the enlarged section 11 which is positioned on one end of the tube is provided with a threaded outer surface 18 upon which the cap 14 is threaded, as shown in Figure 2. The annular recess 13 provides a shoulder 19 against which the inner end of the cell 12 is clamped by the cap 14.

The cap 14 is provided with an opening 20 having a beveled annular surface, forming an eye piece wherein the opening 20 registers with an opening 21 in the cell 12 which is provided in an annular ring 22 against the inner surface of which the lenses 23 and 24 are secured by a threaded ring 25. The ring 25 is threaded in the bore or inner surface of the cell 12 and the outer end of the ring is provided with screwdriver slots 26.

The object being viewed with the microscope is held in position against the inner end of the transparent body 16 with a transparent cap 17 or by adhesive or other suitable material.

The opaque holder 15, which is frictionally held in the bore of the casing 10 is provided with a flange 27 that provides a stop to prevent the inner end of the body 16 striking the surface of the lens. The body 15 may also be provided with a longitudinally disposed groove 28 whereby air in the pocket formed in the interior of the casing may escape as the position of the transparent body is adjusted longitudinally of the casing.

Figure 3:
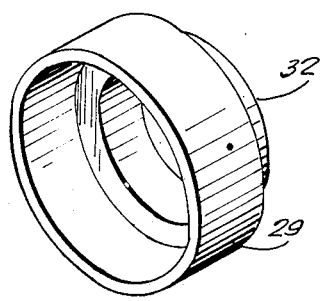
Figure 3 is a detail illustrating the friction collar for mounting the microscope on the lens mounting of a camera.

The microscope is also provided with a collar 29, as shown in Figure 3, for attaching the microscope to a lens mounting 30 of a camera 31 and one section of the collar 29 is adapted to slide over the outer surface of the cap 14 with a smaller section, as indicated by the numeral 32 adapted to slide over the lens mounting 30. The size of the section 32 is made to provide a snug fit on a lens mounting and the position of the device may be reversed with the part 29 on the lens mounting with part 32 on the cap 14.

With the parts formed in this manner the holder 15 is moved longitudinally to adjust the position of an object on the end of the body 16 in relation to the lenses and with the object positioned on the end of a light transmitting body an enlarged image of the object may readily be viewed through the lens or lens system. The size of the image is adjusted by sliding the holder 15 with the body 16 therein and by this means the position of the object is adjustable in relation to the focus of the lens.

The microscope of this invention is adapted for use in a laboratory, or in the field, or it may be used on a camera as shown.

It will be understood that modifications may be made in the design and arrangement of the parts without departing from the spirit of the invention.

What is claimed is:

In a microscope, the combination which comprises an elongated tubular casing having an enlarged end with an annular recess therein, a lens cell removably mounted in the recess in the enlarged end of the casing, a lens positioned in said cell, an elongated tubular holder having a flange on the outer end frictionally and slidably mounted in the casing, and an elongated transparent body carried by the said holder, the object being viewed being retained on the end of the transparent body positioned in the casing by a transparent cap frictionally held on the inner end of the said elongated transparent body.

References Cited in the file of this patent

UNITED STATES PATENTS

| | | |
|---|---|---|
| 2,172,246 | Hood | Sept. 5, 1939 |
| 2,638,551 | Landsverk et al. | May 12, 1953 |
| 2,687,480 | Shonka et al. | Aug. 24, 1954 |
| 2,691,918 | Robins et al. | Oct. 19, 1954 |